United States Patent [19]

Dombroski

[11] 4,299,927

[45] Nov. 10, 1981

[54] MOLDING COMPOSITIONS

[75] Inventor: John R. Dombroski, Kingsport, Tenn.

[73] Assignee: Eastman Kodak Company, Rochester, N.Y.

[21] Appl. No.: 146,893

[22] Filed: May 5, 1980

[51] Int. Cl.³ .................................... C08L 51/00
[52] U.S. Cl. ................................ 525/64; 525/69; 525/70; 525/170
[58] Field of Search .................. 525/64, 69, 70, 170

[56] References Cited

U.S. PATENT DOCUMENTS 4,258,143 3/1981 Dombroski et al. ............... 525/64

Primary Examiner—J. Ziegler
Attorney, Agent, or Firm—John F. Stevens; Daniel B. Reece, III

[57] ABSTRACT

Disclosed are polymer compositions comprising from about 75 to about 99% by weight of the reaction product of (a) from about 50 to about 90% by weight, based on the weight of the reaction product, of an ethylenically unsaturated polyester derived from an $\alpha,\beta$-ethylenically unsaturated dicarboxylic acid with a saturated aliphatic polyol, and (b) from about 50 to about 10% by weight, based on the weight of the reaction product, of a modified polyolefin derived from an $\alpha,\beta$-ethylenically unsaturated dicarboxylic acid anhydride and a polyolefin.

The compositions preferably include from about 25 to about 1% by weight of a polymer or copolymer of an olefin in the reaction product, the polymer or copolymer having a molecular weight of from about 500 to about 50,000. The compositions also preferably include as compatibilizing agent an alkyl or alkenyl anhydride, the alkyl or alkenyl groups having from 8 to 22 carbon atoms.

8 Claims, No Drawings

MOLDING COMPOSITIONS

BACKGROUND OF THE INVENTION

1. Field of the Invention

This invention relates to modified unsaturated polyester compositions which have improved physical properties when used as molding compositions. In particular, the modified unsaturated polyester compositions exhibit highly advantageous hydrolytic stability and resistance to chemical degradation.

2. Description of the Prior Art

Unsaturated polyesters are industrially important materials which have broad application in the manufacture of products such as automotive parts, boats, appliance parts, and furniture. Unsaturated polyester compositions have also been applied to the fabricating of pipes, tanks and fume ducts used for handling materials in waste water treatment, selected chemicals, and gas and oil.

One problem which has been encountered in the past with such compositions is that of high polymerization shrinkage of the polyester resin. Shrinkage results in poor surface smoothness and low gloss of molded parts. Polymerization shrinkage also results in poor dimensional agreement between the mold surface and the fabricated part. Another problem encountered is that crosslinked unsaturated polyester matrix is a brittle glassy phase that has low chip and crack resistance at high stress areas such as corners and molded edges. In addition, conventionally formulated unsaturated polyester compositions generally exhibit poor resistance to strong aqueous caustic and acid solutions and can readily degrade in polar organic media.

A method that has been applied for reducing the polymerization shrinkage, and for modifying the final physical properties of the crosslinked compositions, involves the addition of various high molecular weight thermoplastics such as homopolymers of various acrylates, methacrylates, styrene, and vinyl acetate; copolymers of styrene; copolymers of vinyl chloride and vinyl acetate; cellulose esters; saturated polyesters and polycaprolactone. These materials, however, increase the viscosity of the unsaturated polyester resin to such an extent that formulation of other components such as fillers and fiberglass with the resin becomes difficult or impossible. The high viscosity results in poor wet-out of fiber reinforcement and filler, and can impart undesirable physical properties to the final molded product.

Micropulverized polyethylene powder has also been reported as a shrink-control agent in unsaturated polyester molding compounds. The conventional procedure involves mechanically blending polyethylene powder with the polyester-monomer resin syrup along with fillers and fiberglass. A major problem associated with combining polyethylene powder with the resin in this fashion is the extreme difficulty in properly dispersing the powder in the resin phase. Poor dispersion causes porosity and craters which subsequently cause problems of poor physical properties and problems on painting.

U.S. Pat. No. 3,207,816 discloses that modification of reactive, essentially linear ethylenically unsaturated polyester resins, prior to cross-linking, by the addition thereto of an interpolymer of an α,β-ethylenically unsaturated dicarboxylic acid or anhydride with a monoolefin having a terminal methylene group, results in linear alkyd resins having higher molecular weights than are readily obtainable by conventional procedures. The resulting linear alkyd, due to its improved viscosity, is said to impart many outstanding advantages to polyester resinous compositions prepared therefrom. This patent further discloses, however, that the amount of interpolymer or mixture of interpolymers employed may be from about 0.05% to about 10%, preferably about 0.2% to about 3%, by weight based on the total weight of resin forming components.

SUMMARY OF THE INVENTION

According to the present invention, modified unsaturated polyester compositions are provided which have improved physical properties and exhibit unexpected compatibility with high molecular weight polymers. The modified unsaturated polyester compositions comprise the reaction product of (a) from about 50 to about 90% by weight (preferably about 50≧85%), based on the weight of the reaction product, of an ethylenically unsaturated polyester derived from an α,β-ethylenically unsaturated dicarboxylic acid with a saturated aliphatic polyol, and (b) from about 50 to greater than about 10% by weight (preferably about 50–15%), based on the weight of said reaction product, of a modified polyolefin derived by peroxide grafting of an α,β-ethylenically unsaturated dicarboxylic acid or anhydride and a polyolefin.

Preferably, the compositions comprise from about 75 to about 99% by weight of the modified unsaturated polyester and from about 25 to about 1% by weight of a polymer or copolymer of an olefin in the above reaction product, the polymer or copolymer having a molecular weight of from about 500 to about 50,000. The modified, unsaturated polyester compositions are suitable for combining with conventional polymerizable, ethenically unsaturated monomeric cross-linking agents such as styrene.

The compositions may further include from about 0.1 to about 10 percent, preferably from about 0.2 to about 2% based on the total composition weight, of at least one alkyl or alkenyl succinic anhydride wherein the alkyl or alkenyl groups contain from 8 to 22 carbon atoms. Such succinic anhydrides have been found to significantly lengthen the shelf life of the compositions by deterring phase separation.

DETAILED DESCRIPTION OF THE INVENTION

According to the present invention, polymeric compositions having an improved balance of physical properties, including enhanced resistance to water absorption and chemical attack are provided. Also, because of low shrinkage during polymerization, greater dimensional stability and a smooth, crack-free surface of molded parts is realized.

The present invention provides compositions comprising unsaturated polyesters with carboxylated polyolefins, prepared by carrying out the esterification reaction in the presence of the polyolefin. Preferably, the compositions are then melt blended with one or more high molecular weight polymers to form a solid product which may then be combined with a polymerizable, ethylenically unsaturated monomeric cross-linking agent containing a $CH_2=O<$ group having a boiling point, at atmospheric pressure, of 60° C. or greater such as styrene. Surprisingly, the esterification product has good tolerance for the high molecular weight polymer and forms a stable mixture, thus avoiding the usual formation of a separate biphase mixture.

Polyester-General

As is well known, essentially linear, ethylenically unsaturated polyester resins of the type employed in the practice of this invention are conventionally prepared by esterifying an α,β-ethylenically unsaturated polycarboxylic acid or anhydride, alone or together with a non-polymerizable polycarboxylic acid or anhydride, with a saturated aliphatic polyhydric alcohol. In preparing these polyester resinous compositions, it is preferred that there be present at least a stoichiometric amount of the polyhydric alcohol, preferably 5 to 25% excess hydroxy groups as represented by the polyol over the carboxyl groups of the polycarboxylic acid component of the esterification mixture. It will be understood that the term polyester as used herein includes copolymers as well as homopolymers.

Polyester-Acid Reactant

Among the α,β-ethylenically unsaturated polycarboxylic acids that may be used are maleic, fumaric, substituted fumaric, citraconic, mesaconic, teraconic, glutaconic, muconic, and the like, as well as mixtures thereof. Non-polymerizable polycarboxylic acids, i.e., those which do not contain polymerizable α,β-ethylenic unsaturation, may also be used if employed in combination with one or more of the aforementioned α,β-ethylenically unsaturated polycarboxylic acids. Where such non-polymerizable polycarboxylic acids are employed, the amount thereof should not constitute more than about 80% of the total equivalents of carboxyl groups in the esterification mixture. Preferably, such nonpolymerizable polycarboylic acids will be employed in amounts varying between about 35% and 75% of the above-indicated equivalence basis. Among the non-polymerizable polycarboxylic acids that may be used are such as oxalic, malonic, succinic, glutaric, sebacic, adipic, phthalic, isophthalic, terephthalic, substituted phthalic, such as tetrachlorophthalic, suberic, azelaic, tricarballylic, citric, tartaric, cyclopropanedicarboxylic, cyclohexanedicarboxylic, and the like, as well as mixtures thereof.

Polyester-Glycol Reactant

With respect to the saturated aliphatic polyhydric alcohols which may be employed in the preparation of the modified linear alkyds or polyesters, it is preferred that those containing only two hydroxyl groups be used. Among such diols are included ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,4, pentanediol-1,5, hexanediol-1,6, neopentyl glycol, 2,2,4-trimethyl-1,3-pentanediol and the like, as well as mixtures thereof. However, saturated aliphatic polyhydric alcohols containing more than two hydroxyl groups may also be employed. Among such polyols are included glycerol, trimethylol ethane, trimethylol propane, pentaerythritol, sorbitol and the like, as well as mixtures thereof. It is usually desirable that such polyols containing more than two hydroxyl groups be employed in minor proportions relative to the diol or diols used.

Carboxylated Polyolefin Modifier

The carboxylated polyolefins useful in the present invention are commercially available or may be prepared by reacting poly-α-olefins with an unsaturated polycarboxylic component such as unsaturated polycarboxylic acids, anhydrides or esters thereof. Generally, the reaction is carried out in the presence of a free radical source. These poly-α-olefins include homopolymers prepared from alpha-olefin monomers containing 3 to 12 carbon atoms, copolymers of such monomers with each other or copolymers of such monomers and ethylene. The poly-α-olefins also include polyethylenes such as high, medium and low density polyethylenes. One such suitable poly-α-olefin is highly crystalline polypropylene prepared according to U.S. Pat. No. 2,969,345. Commercially available materials include, for example, Epolene C-16 maleated polyethylene and Epolene E-43 maleated polypropylene, products of Eastman Chemical Products, Inc.

The poly-α-olefins are reacted with unsaturated polycarboxylic components such as unsaturated polycarboxylic acids, anhydrides or esters thereof at temperatures generally less than 300° C., preferably from about 130°–240° C., in the presence of free radical sources. Suitable free radical sources are, for example, peroxides such as ditertiary butyl peroxide, t-butyl peracetate, t-butyl perbenzoate, or 2,5-dimethyl-2,5-di(tertiarybutylperoxy)hexane. Suitable irradiation sources also include, for example, ultraviolet light. Preferably, about 1 to 25% of the unsaturated polycarboxylic component, such as unsaturated polycarboxylic acids, anhydrides or esters thereof, based on the weight of the polyolefin, is used in preparing the carboxylated polyolefin used in the invention.

The carboxylated polyolefins useful in the present invention can be prepared either in solution, in solvents such as xylene, mineral spirits and the like, at temperatures of about 130°–200° C. or in the melt phase at temperatures of about 180°–240° C. When the carboxylated polyolefins are prepared in solution, the polyolefin is generally dissolved in refluxing solvent, for example xylene at 140° C., and the unsaturated polycarboxylic component, maleic anhydride, and peroxide initiator dissolved in solvent are added dropwise to the reaction mixture.

The amount of unsaturated component used is determined by the reaction process employed. For example, in a solution proces, the unsaturated component may be present in an amount of about 1 to 25 weight percent. However, in a melt phase reaction, the unsaturated component is preferably present in an amount of about 1 weight percent. The amount of peroxide or free radical agent used is generally quite low being of the order of about 0.01 to about 0.5% based on the weight of the poly-α-olefin.

The reaction may be carried out either in a batchwise or in a continuous manner with contact times in the order of about 1 minute to about 2 hours. The reaction of polyethylenes should be carried out in the absence of oxygen, preferably in an inert nitrogen atmosphere. The reaction of polypropylene and higher α-olefins preferably is carried out in an inert atmosphere. Suitable unsaturated polycarboxylic component such as acids and anhydrides are, for example, maleic acid, maleic anhydride, fumaric acid, citraconic anhydride, aconitic anhydride and itaconic anhydride. Suitable esters are, for example, the half or full esters derived from maleic and fumaric acid such as methyl ethyl fumarate, dimethyl maleate, dimethyl fumarate, methyl ethyl maleate, dibutyl maleate, dipropyl maleate, and the like, maleic acid or anhydride is preferred. The carboxylated polypropylene, higher-α-olefin homopolymers and copolymer compositions have a melt viscosity of 100 to 40,000 at 175° C. and a saponification number of 1 to 200 preferably about 20–80. The carboxylated polyethylene compositions have a melt viscosity of 100 to 40,000 at 175° C. and a saponification number of 1 to 30.

Production of Modified Unsaturated Polyester

The components may be reacted in the manner customarily used in preparing ethylenically unsaturated polyester resins, i.e., at elevated temperatures and atmospheric pressure, although pressures slightly above or below atmospheric may be employed if desired. The reaction temperature is not critical. The preferred temperature will usually be just below the boiling point of the most volatile component of the reaction mixture which is generally the polyol. However, temperatures in excess of the boiling point of the most volatile constituent may be employed if the reaction vessel has been equipped with a steamheated reflux condenser, which permits water of esterification to escape from the reaction vessel while condensing volatilized reaction components and returning them to the reaction sphere.

As indicated previously, the composition of this invention comprise (1) the unsaturated polyester chemically modified with the carboxylated polyolefin, or (2) the unsaturated polyester modified with the carboxylated polyolefin and melt blended with a high molecular weight polymer. In either case, it is preferred to add the carboxylated polyolefin when the acid number of the esterification mixture is between about 40 and about 60, preferably between about 43 and about 57. The amount of carboxylated polyolefin added to the polyester melt is usually in the range of 10–50 wt % based on the total reactant weight of polyester components. The selected carboxylated polyolefin is added to the reaction mixture and the polymerization is continued at a temperature of 190°–200° C. until the acid number reaches 30±5.

High molecular Weight Polymer Additive

In (2) above, after a homogeneous reaction product is obtained, the appropriate amount of high molecular weight polymer is similarly added to the melt. After 10–30 minutes of stirring, a stable, homogeneous polymer blend is obtained.

The composition according to (2) above preferably contains about 75 to about 99% by weight of modified unsaturated polyester and from about 25 to about 1% by weight of the high molecular weight polymer. The term polymer as used in this regard includes homopolymer, copolymer and mixtures thereof. The high molecular weight polymer is normally in powder or pellet form and comprises a polymer of an olefin having a molecular weight of from about 500 to about 50,000. The melt phase advantageously produces an intimate polymer blend with a dispersed phase size between about 1 and about 30 microns. In contrast with previous art, this process produces a nonsetting, homogeneous, resinous product, which on crosslinking with styrene produces a homogeneous thermoset composition in contrast with the bulk, phase separation of components that results from conventional mixture of the reactants.

Alkyl or Alkenyl Succinic Anhydride

To prevent, or significantly delay, phase separation between the unsaturated polyester and the modified polyolefin, it is desirable to add an alkyl or alkenyl succinic anhydride to the composition. Amounts of from about 0.1 to about 10 percent, based on the total weight of the composition may be used. It is preferable to add the alkyl or alkenyl succinic anhydride during the polymerization process as described herein when the acid number of the melt phase reaches 30±5, and then continuing the reaction.

The useful alkyl or alkenyl succinic anhydrides include those having the formula

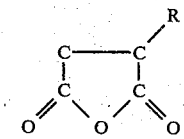

where R is 4 to 22, preferably 8 to 18. It is also preferable that the carbon chain be linear. Preferred alkyl or alkenyl succinic anhydrides include n-octenyl, n-decyl, n-dodecenyl, n-hexadecyl, n-octadecyl, and n-docosenyl.

Preparation of Molding Composition

In preparing polyester resinous compositions from the modified unsaturated polyesters, they are combined with a polymerizable, ethylenically unsaturated monomeric crosslinking agent containing a $CH_2=C<$ group and desirably having a boiling point, at atmospheric pressure of 60° C. or greater.

Among such polymerizable compounds there are included styrene, side chain substituted styrenes such as the α-methyl styrene, α-ethyl styrene, and the like, ring substituted styrenes, such as alkyl styrenes, e.g., ortho-, meta- and para-alkyl styrenes, e.g., o-methyl styrene, p-ethyl styrene, meta-propyl styrene, 2,4-dimethyl styrene, 2,5-diethyl styrene, and the like, halostyrenes, e.g., o-bromostyrene, p-chlorostyrene, 2,4-dichlorostyrene, and the like. Alkyl esters of acrylic and methacrylic acid, e.g., methyl, ethyl or butyl acrylate, methyl methacrylate, and the like, may also be employed. In addition, one may also use aliphatic vinyl esters such as vinyl acetate, vinyl butyrate, vinyl laurate, acrylonitrile, methacrylonitrile, vinyl chloride, and the like. Further, acrylamide, methacrylamide and their derivatives may be employed. Still further, one can make use of the allyl compounds such as diallyl phthalate, allyl acetate, allyl methacrylate, diallyl carbonate, allyl lactate, allyl α-hydroxyisobutyrate, allyl trichlorosilane, allyl acrylate, diallyl malonate, diallyl oxalate, diallyl gluconate, diallyl methyl gluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylenetetrahydrophthalic anhydride, triallyl tricarballylate, triallyltrimesate, triallyl aconitate, triallyl cyanurate, triallyl citrate, triallyl phosphate, trimethallyl phosphate, tetraallyl silane, tetraallyl silicate, hexallyl disiloxane and the like. These polymerizable, ethylenically unsaturated monomeric cross-linking agents may be used singly or in combination with one another.

The ratio of the unsaturated polyester to the monomeric crosslinking agent may be varied over a wide range and, therefore, this ratio is not critical. For example, the unsaturated reactive resin content may range from about 10 to about 90% of the total weight of this copolymerizable mixture. For most purposes, however, the polyester resinous compositions will comprise from about 30 to 60 parts of the unsaturated resin and correspondingly from about 70 to 40 parts of the polymerizable monomer.

In order to facilitate the copolymerization of the monomeric cross-linking agent with the reactive resin, it is preferred that a polymerization catalyst be incorporated in the composition at the time of its curing. The type and amounts of these catalytic materials which may be used are well known in the art, and any material which normally induces polymerization of polyester resinous compositions can be utilized. The optimum reaction conditions are modified to some extent by the choice of the particular catalyst used in the process. A very active catalyst should be used in lower concentrations, and preferably at lower temperatures, than a less reactive material. The catalysts that are preferably employed comprise a wide variety of organic superoxides, i.e., organic peroxides ("acidic peroxides") and hydroperoxides ("alcoholic peroxides"). Mixtures of peroxides and hydroperoxides, including commercially available mixtures such as methyl ethyl ketone peroxide, cyclohexanone peroxide, and the like, are especially effective as catalysts. Among the organic peroxide catalysts that may be employed are such as acetyl peroxide, benzoyl peroxide, substituted benzoyl peroxides, and particularly halogenated benzoyl peroxides such as p-bromobenzoyl peroxide, 2,4-dichlorobenzoyl peroxide, etc., benzoyl acetyl peroxide, phthalyl peroxide succinyl peroxide, fatty oil acid peroxides, such as coconut oil peroxide, lauryl peroxide, stearyl peroxide, oleyl peroxide, anisoyl peroxide, toluyl peroxide, and the like. Organic peracids, such as peracetic acid and perbenzoic acid, may also be employed. Among the organic hydroperoxide catalysts that may be employed are such as tertiary butyl hydroperoxide, cumene hydroperoxide, diisopropyl benzene hydroperoxide, 1-hydroxycyclohexyl hydroperoxide, the terpene oxides, such as ascaridole, 1-p-menthane hydroperoxide, etc., and the like. Various other types of polymerization catalyst may also be employed, for example, compounds such as aluminum chloride, stannic chloride, boron trifluoride, or the azo-type catalysts such as α,α'-azobisisobutyronitrile.

Since the polyester constituents of the resinous compositions mentioned above contain a high degree of polymerizable unsaturation, it is often desirable to incorporate a polymerization inhibitor therewith. The inhibitor, i.e., a material whose primary function is to retard internal polymerization of the polyester constituent of the resinous composition, effects stabilization of the composition during any storage period encountered prior to curing. However, once the resinous composition is contacted with a sufficient amount of a polymerization catalyst, the effect of the inhibitor will be overcome. Among the inhibitors that may be used are such as phenol; the monoalkyl phenols, such as ortho-, meta-, and para-cresol, as well as mixtures of such isomers; polyalkyl phenols having a plurality of the same or different substituents, e.g., ethyl, propyl, butyl, and higher alkyl radicals attached to their nuclei; catechol, tertiary butyl catechol, hydroquinone, tertiary butyl hydroquinone, resorcinol, eugenol guaiacol, pyrogallol, benzaldehyde, tannic acid, ascorbic acid, isoascorbic acid, phenylene diamine, sym-di-$\beta$-naphthyl-p-phenylene diamine, aniline, and the like. The amount of polymerization inhibitor employed depends on the nature of the polyester resinous composition as well as the period of storage stability required. Generally, from about 0.001% to 0.3% by weight, based on the total weight of polymerizable reactive components present, will be sufficient.

Inhibitors of this type may be added to the reactive resin during the preparation thereof or optionally added later to the compounded polyester resinous composition. In addition, other known additives may be employed such as promoters used in conjunction with the catalyst, mold lubricants, fillers and reinforcements, colorants, flow promoters, ultraviolet absorbing compounds, and the like.

The conditions necessary for curing the polyester resinous compositions of this invention do not depart from the practice ordinarily observed in curing this type of composition. They may be cured in contact with air or in enclosed molds at temperatures ranging from about 10° C. to about 160° C. or even higher as long as they are kept below the point at which the particular resinous composition employed begins to decompose. Where it is convenient, it is especially desirable to cure the resinous compositions by heating the catalyzed, resin-forming mass to between 90° C. and about 150° C. for a period of about 3 to 90 minutes.

The following examples are submitted for a better understanding of the invention.

The following abbreviations, tradenames or trademarks are used herein:

Epolene ® C-16 resin—maleated polyethylene having a saponification number of 4.0 and a melt viscosity of 4180 cp at 175° C.

Epolene ® E-43 resin—maleated polypropylene having a saponification number of 60 and a melt viscosity of <1000 cp at 175° C.

Maleated Epolene ® N-14 resin—maleated polyethylene having a saponification number of 72 and a melt viscosity of 2600 cp at 175° C.

Maleated Epolene ® C-15 resin—maleated polyethylene having a saponification number of 43 and a melt viscosity of 12,000 cp at 175° C.

Tenite ® 424S resin—polypropylene having a melt flow rate at 230° C. of 9.

EG—ethylene glycol.
IPA—isophthalic acid.
TPA—terephthalic acid
TMPD ® glycol chemical—2,2,4-trimethyl-1,3-pentanediol.
MA—maleic anhydride.
DMT—dimethyl terephthalate.
PG—propylene glycol.

In the examples, Tensile Strength and Elongation are measured in accordance with ASTM D638; Impact Strength in accordance with ASTM D256-56; and Flexural Stress (Flex. Str.) and Flexural Modulus (Flex. Mod.) in accordance with D671.

EXAMPLES 1-11

In Examples 1-11, an unsaturated polyester is prepared from 75 mole percent TMPD, 25 mole percent EG, 50 mole percent IPA and 50 mole percent MA. Unsaturated polyester is modified as indicated. The resin is dissolved in styrene monomer, test samples cast, and after crosslinking, the physical properties are as indicated.

| Example | Polyolefin Modifier | Tensile Strength (psi) | Elong. to Break (%) | Izod Impact Strength Ft-Lb/In. | Flex. Str. (psi) | Flex. Mod. (psi) |
|---|---|---|---|---|---|---|
| 1 | -(Control) | 2168 | 4 | 0.72 | $6.84 \times 10^3$ | $4.61 \times 10^5$ |
| 2 | 10% Epolene C-16 | 4275 | 4 | 1.03 | $8.77 \times 10^3$ | $4.57 \times 10^5$ |
| 3 | 10% Epolene E-43 | 3495 | 4 | 1.07 | $7.13 \times 10^3$ | $4.03 \times 10^5$ |

The above table of physical properties illustrates the tensile strength, impact strength, and flexural strength of thermoset compositions prepared with 10 wt % maleated polyethylene and maleated polypropylene, respectively.

| Example | Polyolefin Modifier in Unsaturated Polyester | % Retention of Flexural Strength | | |
|---|---|---|---|---|
| | | 3 Days | 6 days | 12 Days |
| 4 | -(Control) | 87.5% | 66.5% | 37% |
| 5 | 30% Epolene C-16 | 88.9% | 68.4% | 56% |
| 6 | 30% Epolene E-43 | 64.4% | 65.2% | 16% |
| 7 | 30% Maleated Epolene N-14 | 61.2% | 40.9% | 13% |

Examples 4–7 illustrate the significant improvement in retention of flexural strength of thermoset samples containing Epolene C-16, compared with the control, on exposure to hot caustic solution over a period of 12 days. The caustic is 10% NaOH solution. The cycle is 8 hours per day at 100° C. and 16 hours per day at 70° C.

| Example | Polyolefin Modifier in Unsaturated Polyester | % Shrinkage of Thermoset |
|---|---|---|
| 8 | -(Control) | 3.50% |
| 9 | 10% Maleated Epolene C-15 | 3.43% |
| 10 | 10% Epolene E-43 | 3.24% |
| 11 | 10% Epolene C-16 | 2.88% |

The ability of the unsaturated polyester/polyolefin compositions to reduce thermoset shrinkage of an unsaturated polyester resin is shown in Examples 8–11. Resin samples are prepared with the following resin composition:
  59.5% unsaturated polyester resin
  39.5% styrene monomer
  1.0% benzoyl peroxide
The resin samples are degassed and decanted into the cavity of a precision machined stainless-steel mold. The crosslinking reaction is initiated by heating the mold in a water bath at 100° C. for 15 min. After cooling, the diameter of the thermoset sample is measured with a micrometer and the shrinkage is calculated relative to the inside diameter of the mold.

EXAMPLES 12–39

Into a three-neck flask is added 241.3 g (1.65 moles) of TMPD, 166.1 g (1.00 mole) of isophthalic acid, 0.54 g of dibutyltin oxide and 0.54 g of sodium tetraborate. The reaction is heated under nitrogen at 195°–205° C. This first-stage is reacted for about 15 hr., at which time the acid number of the polymer is less than 20. The polymer is cooled and 34.1 g (0.55 mole) of ethylene glycol, 98.1 g (1.0 mole) of maleic anhydride and 0.05 g of toluhydroquinone are added. The reaction is heated and the reaction continued at a temperature of 190°–200° C. until the acid number is about 30. Then 53.9 g of maleated polypropylene (Epolene E-43 resin, 10 wt. % based on the total reactant charge weight) is added. Within a few minutes the maleated polypropylene melts and becomes homogeneous with the polyester melt. The reaction is continued until the acid number is about 20. The polyester/maleated polypropylene resin is decanted from the flask, cooled and dissolved in 30 wt. % styrene monomer. The styreneated resin is homogeneous in appearance and remains as a single phase after standing for several days. The thermoset casting is prepared by further addition of styrene monomer until 40 wt. % styrene is present. Then 1% benzoyl peroxide is added and the resin is poured between two glass plates, sealed around three sides by a ⅛ in. thick spacer gasket. The casting is heated sequentially at 70° C. for 2 hr., 100° C. for 1 hr., 125° C. for 1 hr. and 150° C. for 1 hr. to crosslink the polyester/maleated polypropylene composition. The crosslinked casting is then cut into flexural bars (⅛ in.×½ in.×4 in.) for physical property measurement. The physical property data are shown in Examples 12–17.

The evaluation of the corrosion resistance of the crosslinked composition is carried out by placing the flexural bars in boiling 10% sodium hydroxide in Examples 18–23. Samples are removed after 3, 6 and 12 days and the flexural strength is determined. Examples 19 clearly shows the higher retention of flexural strength for the polyester/polypropylene compositions compared with the polyester control.

Tests are repeated using different levels of carboxylated polyolefin additive. The results are included in Examples 12–39. In all the examples except 17 and 23, the polyester is 75/25 TMPD/EG, 1/1 IPA/MA. In Examples 17 and 23 a bisphenol —A— fumarate is used.

| Ex. | Polyolefin Additive | Melt Dispersibility of Additive | Appearance of Thermoset Casting | FLEXURAL PROPERTIES | | TENSILE PROPERTIES | | IMPACT STRENGTH Unnotched |
|---|---|---|---|---|---|---|---|---|
| | | | | Flexural Strength (PSI) | Flexural Modulus (PSI) | Tensile Strength (PSI) | Elongation to Break(%) | Izod Strength (Ft-Lb/In.) |
| 12 | - Control | — | Clear | $10.59 \times 10^3$ | $4.82 \times 10^5$ | 3553 | 5 | 2.18 |

-continued

| Ex. | Polyolefin Additive | Melt Dispersibility of Additive | Appearance of Thermoset Casting | FLEXURAL PROPERTIES Flexural Strength (PSI) | Flexural Modulus (PSI) | TENSILE PROPERTIES Tensile Strength (PSI) | Elongation to Break(%) | IMPACT STRENGTH Unnotched Izod Strength (Ft-Lb/In.) |
|---|---|---|---|---|---|---|---|---|
| 13 | 10% Epolene E-43 | Homogeneous | Nearly Clear, Homogeneous | $8.93 \times 10^2$ | $4.67 \times 10^5$ | 4161 | 7 | 1.01 |
| 14 | 20% Epolene E-43 | " | Sl. Opaque, Homogeneous | $7.00 \times 10^3$ | $4.48 \times 10^5$ | 3743 | 5 | 0.70 |
| 15 | 30% Epolene E-43 | " | Sl. Opaque, Homogeneous | $5.85 \times 10^3$ | $4.49 \times 10^5$ | 3457 | 5 | 0.89 |
| 16 | 40% Epolene E-43 | " | Sl. Opaque, | $6.70 \times 10^3$ | $4.42 \times 10^5$ | 3272 | 4 | 0.82 |
| 17 | - Commercial Control | | Clear | $11.47 \times 10^3$ | $4.42 \times 10^5$ | 4009 | 7 | 1.19 |

| Ex. | Polyolefin Additive | Initial Flexural Strength (PSI) | Exposure to Boiling 10% NaOH Flexural Strength & % Retention of Flexural Strength | | | | | | Appearance After 12 Days |
|---|---|---|---|---|---|---|---|---|---|
| | | | After 3 Days Flexural Strength (PSI) | % Ret. Flex. Str. | After 6 Days Flexural Strength (PSI) | % Ret. Flex. Str. | After 12 Days Flexural Strength (PSI) | % Ret. Flex. Str. | |
| 18 | - Control | $10.59 \times 10^3$ | $3.75 \times 10^3$ | 35% | $4.03 \times 10^3$ | 38% | $2.79 \times 10^3$ | 26% | Pitted, hazy surface |
| 19 | 10% Epolene E-43 | $8.73 \times 10^3$ | $7.78 \times 10^3$ | 89% | $6.72 \times 10^3$ | 77% | $6.08 \times 10^3$ | 70% | Hazy surface |
| 20 | 20% Epolene E-43 | $7.00 \times 10^3$ | $7.58 \times 10^3$ | 108% | $7.10 \times 10^3$ | 102% | $5.60 \times 10^3$ | 80% | Hazy surface |
| 21 | 30% Epolene E-43 | $5.85 \times 10^3$ | $3.95 \times 10^3$ | 68% | $4.18 \times 10^3$ | 71% | $3.73 \times 10^3$ | 64% | Hazy surface |
| 22 | 40% Epolene E-43 | $6.70 \times 10^3$ | $2.91 \times 10^3$ | 43% | $3.70 \times 10^3$ | 55% | $2.13 \times 10^3$ | 32% | Hazy surface |
| 23 | - Commercial Control | $11.47 \times 10^3$ | $9.99 \times 10^3$ | 87% | $8.94 \times 10^3$ | 78% | $9.51 \times 10^3$ | 83% | Smooth, Glossy surface |

| Ex. | Polyolefin Additive | Melt Dispersibility of Additive | Appearance of Thermoset Casting | Flexural Properties Flexural Strength (PSI) | Flexural Modulus (PSI) | Tensile Properties Tensile Str. (PSI) | Elongation to Break (%) | Impact Strength Unnotched Izod Strength (Ft-Lb/In.) | Standard Deviation (Ft-Lb/In.) |
|---|---|---|---|---|---|---|---|---|---|
| 24 | - Control - | — | Clear | $10.59 \times 10^3$ | $4.82 \times 10^5$ | 3553 | 5 | 2.18 | 0.04 |
| 25 | 5% Epolene C-16 | Homogeneous | Opaque, White | $6.76 \times 10^3$ | $3.61 \times 10^5$ | 1870 | 2 | 0.95 | 0.05 |
| 26 | 10% Epolene C-16 | Homogeneous | Opaque, White | $7.61 \times 10^3$ | $4.24 \times 10^5$ | 2240 | 3 | 1.12 | 0.02 |
| 27 | 15% Epolene C-16 | Homogeneous | Opaque, White | $6.97 \times 10^3$ | $3.42 \times 10^5$ | 2162 | 2 | 0.74 | 0.01 |
| 28 | 20% Epolene C-16 | Homogeneous | Opaque, White | $7.20 \times 10^3$ | $3.42 \times 10^5$ | 1708 | 2 | 1.21 | 0.02 |
| 29 | 25% Epolene C-16 | Homogeneous | Opaque, White | $7.03 \times 10^3$ | $2.75 \times 10^5$ | 1924 | 2 | 0.68 | 0.01 |
| 30 | 30% Epolene C-16 | Homogeneous | Opaque, White | $5.55 \times 10^3$ | $2.73 \times 10^5$ | 1912 | 3 | 0.78 | 0.01 |
| 31 | 40% Epolene C-16 | Homogeneous | Opaque, White | $5.13 \times 10^3$ | $2.58 \times 10^3$ | 1651 | 3 | 0.46 | 0.01 |

| Ex. | Polyolefin Additive | Initial Flexural Strength (PSI) | After 12 Days in Boiling 10% NaOH Flexural Strength (PSI) | % Retention Flexural Strength | Appearance After 12 Days in Boiling 10% NaOH |
|---|---|---|---|---|---|
| 32 | - Control | $10.59 \times 10^3$ | $2.79 \times 10^3$ | 26% | Pitted, Hazy Surface |
| 33 | 5% Epolene C-16 | $6.76 \times 10^3$ | $3.93 \times 10^3$ | 58% | |
| 34 | 10% Epolene C-16 | $7.61 \times 10^3$ | $4.98 \times 10^3$ | 65% | Smooth, Semi-Dull |
| 35 | 15% Epolene C-16 | $6.97 \times 10^3$ | $3.67 \times 10^3$ | 53% | Smooth, Semi-Dull |
| 36 | 20% Epolene C-16 | $7.20 \times 10^3$ | $2.42 \times 10^3$ | 32% | Pitted, Dull |

-continued

| Ex. | Polyolefin Additive | Initial Flexural Strength (PSI) | After 12 Days in Boiling 10% NaOH Flexural Strength And % Retention Flexural Strength | | Appearance After 12 Days in Boiling 10% NaOH |
|---|---|---|---|---|---|
| | | | Flexural Strength (PSI) | % Retention Flexural Strength | |
| 37 | 25% Epolene C-16 | 7.03 × 10³ | 3.66 × 10³ | 52% | Smooth, Semi-Dull |
| 38 | 30% Epolene C-16 | 5.55 × 10³ | 3.11 × 10³ | 56% | Smooth, Semi-Dull |
| 39 | 40% Epolene C-16 | 5.13 × 10³ | 2.79 × 10³ | 55% | Smooth, Semi-Dull |

EXAMPLES 40-55

Polyolefins with selected levels of maleation (saponification no.) and melt viscosity are added to the 2nd stage melt phase polycondensation of unsaturated polyesters. The polyester is again 75/25 TMPD/EG, 1/1 IPA/MA except bisphenol-A-fumarate is used in Examples 47 and 55. The polyester/polyolefin resin products are dissolved in 40% styrene and crosslinked in the usual manner. Flexural bar specimens (⅛ in.×½ in.×4 in.) are evaluated for physical properties and also placed in boiling 10% NaOH. Specimens are removed after 3, 6, 12 and 30 days and the retention of flexural strength is determined (Examples 48-55). It is found that the polyester/polyolefin compositions overall exhibit excellent hydrolytic resistance compared to the unmodified resin control. The composition containing maleated Epolene C-10 also shows corrosion resistance comparable to a commercial high performance bisphenol-A fumarate material. Thermoset compositions prepared with polyolefins of high melt viscosity and high maleation give the best overall balance of physical properties and exhibit excellent corrosion resistance.

| Ex. | Polyolefin Additive | Melt Dispersibility of Additive | Appearance of Thermoset Casting | Flexural Properties | | Tensile Properties | | Impact Strength Unnotched Izod Strength (Ft-Lb/In) |
|---|---|---|---|---|---|---|---|---|
| | | | | Flexural Strength (PSI) | Flexural Modulus (PSI) | Tensile Strength (PSI) | Elongation to Break % | |
| 40 | - Control | — | Clear | 10.59 × 10³ | 4.82 × 10⁵ | 3553 | 5 | 2.18 |
| 41 | 10% Epolene E-43 | Homogeneous | Homogeneous, Nearly Clear | 8.73 × 10³ | 4.67 × 10⁵ | 4161 | 7 | 1.01 |
| 42 | 10% Epolene C-16 | Homogeneous | Homogeneous, White | 9.40 × 10³ | 4.02 × 10⁵ | | | |
| 43 | 10% Maleated Epolene C-10 | Homogeneous | Uniform Dispersion Sl. Yellow | 6.60 × 10³ | 4.30 × 10⁵ | 3583 | 6 | 0.68 |
| 44 | 10% Maleated Epolene N-14 | Homogeneous | Uniform Dispersion Sl. Yellow | 6.69 × 10³ | 4.16 × 10⁵ | 3123 | 4 | 0.97 |
| 45 | 5% Maleated Epolene C-15 | Homogeneous | Uniform Dispersion Sl. Yellow | 8.89 × 10³ | 4.63 × 10⁵ | 4111 | 8 | 1.38 |
| 46 | 20% Maleated Epolene C-15 | Homogeneous | Uniform Dispersion Sl. Yellow | 9.67 × 10³ | 3.46 × 10⁵ | 4638 | 8 | 1.86 |
| 47 | - Commercial Control | — | Clear | 11.47 × 10³ | 4.42 × 10⁵ | 4009 | 7 | 1.19 |

| Ex. | Polyolefin Additive | Initial Flexural Strength (PSI) | Exposure to Boiling 10% NaOH Flexural Strength and % Retention of Flexural Strength | | | | | |
|---|---|---|---|---|---|---|---|---|
| | | | After 3 Days | After 6 Days | After 12 Days | Appearance After 12 Days | After 30 Days | Appearance After 30 Days |
| 48 | Control | 10.59 × 10³ | 3.75 × 10³ / 35% Ret. | 4.03 × 10³ / 38% Ret. | 2.79 × 10³ / 26% Ret. | Pitted, hazy surface | — | — |
| 49 | 10% Epolene E-43 | 8.73 × 10³ | 7.78 × 10³ / 89% Ret. | 6.72 × 10³ / 77% Ret. | 6.08 × 10³ / 70% Ret. | Slight hazy surface | — | — |
| 50 | 10% Epolene C-16 | 9.40 × 10³ | 6.46 × 10³ / 69% Ret. | 6.47 × 10³ / 69% Ret. | 7.70 × 10³ / 82% Ret. | Smooth, glossy surface | — | — |
| 51 | 10% Maleated Epolene C-10 | 6.60 × 10³ | — | 6.54 × 10³ / 99% Ret. | 6.98 × 10³ / 106% Ret. | Smooth, glossy surface | 5.15 × 10³ / 78% Ret. | Smooth, glossy surface |
| 52 | 10% Maleated Epolene N-14 | 6.69 × 10³ | 6.72 × 10³ / 101% Ret. | 5.48 × 10³ / 82% Ret. | 3.04 × 10³ / 45% Ret. | Blister on Surface | — | — |

-continued

| Ex. | Polyolefin Additive | Initial Flexural Strength (PSI) | Exposure to Boiling 10% NaOH Flexural Strength and % Retention of Flexural Strength | | | | | |
|---|---|---|---|---|---|---|---|---|
| | | | After 3 Days | After 6 Days | After 12 Days | Appearance After 12 Days | After 30 Days | Appearance After 30 Days |
| 53 | 5% Maleated Epolene C-15 | 8.89 × 10³ | — | 7.98 × 10³ / 90% Ret. | 6.59 × 10³ / 74% Ret. | Smooth, glossy surface | 1.85 × 10³ / 21% Ret. | Some pitting surface erosion |
| 54 | 20% Maleated Epolene C-15 | 9.67 × 10³ | — | 6.40 × 10³ / 66% Ret. | 5.51 × 10³ / 57% Ret. | Some pitting surface erosion | 1.63 × 10³ / 17% Ret. | pitted with surface erosion |
| 55 | -Commercial Control | 11.47 × 10³ | 9.99 × 10³ / 87% Ret. | 8.94 × 10³ / 78% Ret. | 9.51 × 10³ / 83% Ret. | Smooth, glossy surface | — | — |

These examples demonstrate the preparation, properties and corrosion resistance of polyester/polyolefin compositions fabricated with 30 wt. % glass fiber reinforcement. The polyester/polyolefin resins shown in Examples 56–79 are prepared in the same manner as described in the previous examples. The resins are dissolved in 40% styrene and combined with 30 wt. % three-ply glass fiber mats and crosslinked at room temperature with 0.5% cobalt naphthenate and 1% methylethylketone peroxide. The laminates are then postcured in an air oven at 70° C. for 2 hr., cooled, and cut into flexural bars (⅛ in. × ½ in. × 4 in.). The initial physical properties are shown in Examples 56–63. The flexural bars are placed in boiling 10% NaOH, boiling 25% acetic acid, boiling 5% nitric acid and boiling distilled water. After 12 days exposure the samples are removed and evaluated for retention of flexural strength (Examples 64–71) and flexural modulus (Examples 72–79). It is found that the DMT-based resin prepared with 20% Epolene E-43 and 5% Tenite 424S shows excellent corrosion resistance compared with the conventional polyester control. The polyester compositions for Examples 56–79 are given in the following table.

| Code | Polyester | Polyolefin Modifier |
|---|---|---|
| A | TMPD/EG/ISO/MA | Control |
| B | TMPD/EG/ISO/MA | 10% Epolene C-16 |
| C | TMPD/EG/ISO/MA | 20% Epolene C-16 |
| D | TMPD/EG/ISO/MA | 20% Epolene E-43 + 5% Tenite 424S |
| E | TMPD/PG/DMT/MA | Control |
| F | TMPD/PG/DMT/MA | 20% Epolene E-43 |
| G | TMPD/PG/DMT/MA | 20% Epolene E-43 + 5% Tenite 424S |
| H | ATLAC 382 (Bisphenol-A fumarate) Commercial Control | |

| Ex. | Composition Code | Tensile Strength (PSI) | Elongation to Break (%) | Flexural Strength (×10⁵ PSI) | Flexural Modulus (×10⁵ PSI) | Izod Impact Strength (Ft-Lb/In.) |
|---|---|---|---|---|---|---|
| 56 | A | 13,651 | 14 | 28.5 | 12.8 | 12.1 |
| 57 | B | 14,569 | 9 | 26.7 | 11.5 | 12.8 |
| 58 | C | 15,314 | 9 | 25.1 | 10.6 | 13.2 |
| 59 | D | 15,901 | 10 | 24.0 | 10.2 | 10.6 |
| 60 | E | 13,324 | 13 | 21.8 | 10.6 | 13.4 |
| 61 | F | 14,323 | 12 | 24.9 | 10.5 | 10.7 |
| 62 | G | 13,068 | 13 | 18.5 | 8.0 | 13.5 |
| 63 | H | 17,420 | 10 | 30.2 | 12.4 | 14.4 |

| | | | Corrosion Resistance Testing | | | |
|---|---|---|---|---|---|---|
| | | Initial Flexural | % Retention of Flexural Strength 12 Days Exposure | | | |
| Ex. | Composition Code | Strength (×10³ PSI) | Boiling 10% NaOH | Boiling 5% HNO₃ | Boiling 25% HOAC | Boiling Dist. H₂O |
| 64 | A | 28.5 | 73% (20.71) | 3% (0.71) | 76% (21.59) | 106% (30.30) |
| 65 | B | 26.7 | 53% (14.20) | 0 | 69% (18.36) | 74% (19.62) |
| 66 | C | 25.1 | 63% (15.79) | 11% (2.67) | 85% (21.40) | 125% (31.50) |
| 67 | D | 24.0 | 53% (12.59) | 67% (16.00) | 0 | 70% (16.64) |
| 68 | E | 21.8 | 4% (0.76) | 93% (20.27) | 81% (17.76) | 104% (22.65) |
| 69 | F | 24.9 | 6% (1.44) | 78% (19.36) | 113% (27.96) | 96% (23.94) |
| 70 | G | 18.5 | 34% (6.21) | 132% (24.40) | 117% (21.71) | 124% (22.93) |
| 71 | H | 30.2 | 29% (8.80) | 98% (29.77) | 97% (29.20) | 83% (24.93) |

| Ex. | Composition Code | Initial Flexural Modulus ($\times 10^5$ PSI) | % Retention of Flexural Modulus 12 Days Exposure | | | |
|---|---|---|---|---|---|---|
| | | | Boiling 10% NaOH | Boiling 5% HNO$_3$ | Boiling 25% HOAC | Boiling Dist. H$_2$O |
| 72 | A | 12.8 | 57% (7.32) | 23% (2.93) | 28% (3.5) | 98% (12.6) |
| 73 | B | 11.5 | 37% (4.19) | 0 | 56% (6.38) | 66% (7.60) |
| 74 | C | 10.6 | 50% (5.28) | 26% (2.73) | 79% (8.40) | 93% (9.84) |
| 75 | D | 10.2 | 29% (2.95) | 60% (6.12) | 0 | 65% (6.61) |
| 76 | E | 10.6 | 2% (0.27) | 81% (8.51) | 68% (7.20) | 91% (9.58) |
| 77 | F | 10.5 | 16% (1.62) | 72% (7.54) | 80% (8.42) | 74% (7.79) |
| 78 | G | 8.0 | 56% (4.47) | 103% (8.28) | 91% (7.28) | 108% (8.67) |
| 79 | H | 12.4 | 76% (9.35) | 95% (11.7) | 90% (11.14) | 87% (10.77) |

EXAMPLES 80-103

The examples illustrate the effect of sequence of addition of polyolefins during the melt phase preparation of unsaturated polyester on the physical properties and corrosion resistance of the crosslinked compositions.

The unsaturated polyesters are prepared by a conventional 2-stage reaction wherein TMPD and IPA are reacted in the first stage until the acid number is about 20 and then ethylene glycol and maleic anhydride are added and the reaction is continued until the final acid no. was ≦30. This experiment is designed to enable the addition of maleated polypropylene (Epolene E-43) and a high mol. wt. polypropylene (Tenite 424S) at selected intervals during the polyesterification. The first table which follows shows the plan for the designed experiment involving the addition of polyolefins to the unsaturated polyester preparation.

Examples 80-91 show the effect of adding the polyolefins at selected times during the polyesterification reaction. Examples 82, 83 and 84 result in unprocessable compositions. Examples 87 and 88 result in thick resins containing gel particles. The other examples result in homogeneous resins and give uniform, translucent thermoset castings.

Examples 92-103 show the effect of these processing variables on the corrosion resistance. This example clearly demonstrates the importance of selecting the preferred sequence of polyolefin addition to the polyester melt to obtain compositions with enhanced corrosion resistance.

| Experiment No. | 1 | 2 | 3 | 4 | 5 | 6 | 7 | 8 | 9 | 10 | 11 | 12 |
|---|---|---|---|---|---|---|---|---|---|---|---|---|
| First-Stage | | | | | | | | | | | | |
| Start | A&B | A | B | | | | | A | B | A | | |
| Acid No. 50 | | | | | | | | | | | A | CONTROL |
| Acid No. 20 | | B | A | | | | | | | | | |
| Second-Stage | | | | | | | | | | | | |
| Start | | | | A&B | A | B | B | A | | | | |
| Acid No. 50 | | | | | | | | | | B | A | |
| Acid No. 20 | | | | | B | A | | | | B | B | |

A = 20 wt. % Epolene E-43
B = 5 wt. % Tenite 424

| Ex. | Experiment No. | Melt Dispersibility of Polyolefins | Appearance of Thermoset Casting | Flexural Properties | | Tensile Properties | | Impact Strength Unnotched Izod Strength (Ft-Lb/In.) |
|---|---|---|---|---|---|---|---|---|
| | | | | Flexural Strength (PSI) | Flexural Modulus (PSI) | Tensile Strength (PSI) | Elongation to Break (%) | |
| 80 | 1 | Homogeneous | Translucent | $7.09 \times 10^3$ | $3.99 \times 10^5$ | 3742 | 4 | 0.70 |
| 81 | 2 | " | " | $5.95 \times 10^3$ | $4.38 \times 10^5$ | 2629 | 4 | 0.65 |
| 82 | 3 | " | Phase Separated No Casting Made | — | — | — | — | — |
| 83 | 4 | Gel Particles | " | — | — | — | — | — |
| 84 | 5 | Homogeneous | " | — | — | — | — | — |
| 85 | 6 | " | Translucent | $6.39 \times 10^3$ | $4.17 \times 10^5$ | 2288 | 2 | 1.14 |
| 86 | 7 | " | " | $6.94 \times 10^3$ | $4.19 \times 10^5$ | 3654 | 5 | 0.88 |
| 87 | 8 | Gel Particles, thick | " | $5.00 \times 10^3$ | $4.09 \times 10^5$ | 3280 | 5 | 0.66 |
| 88 | 9 | Gel Particles, thick | " | $8.47 \times 10^3$ | $4.27 \times 10^5$ | 3532 | 3 | 1.02 |
| 89 | 10 | Homogeneous, Low Viscosity | " | $8.76 \times 10^3$ | $4.33 \times 10^5$ | 2954 | 4 | 1.11 |
| 90 | 11 | Homogeneous, thick | " | $6.63 \times 10^3$ | $4.40 \times 10^5$ | 3125 | 3 | 1.02 |
| 91 | 12 | Clear, Low | Clear, | $12.48 \times 10^3$ | $4.79 \times 10^5$ | 4014 | 4 | 2.34 |

-continued

| Ex. | Experiment No. | Melt Dispersibility of Polyolefins | Appearance of Thermoset Casting | Flexural Properties | | Tensile Properties | | Impact Strength Unnotched Izod Strength (Ft-Lb/In.) |
|---|---|---|---|---|---|---|---|---|
| | | | | Flexural Strength (PSI) | Flexural Modulus (PSI) | Tensile Strength (PSI) | Elongation to Break (%) | |
| (Control) | | Viscosity | Transparent | | | | | |

| | | | Exposure to Boiling 10% NaOH Flexural Strength and % Retention of Flexural Strength | | | |
|---|---|---|---|---|---|---|
| | | | After 12 Days | | After 30 Days | |
| Ex. | Experiment No. | Initial Flexural Strength (PSI) | Flexural Strength (PSI) | % Retention of Flexural Strength | Flexural Strength (PSI) | % Retention of Flexural Strength |
| 92 | 1 | $7.09 \times 10^3$ | $5.30 \times 10^3$ | 75% | $2.47 \times 10^3$ | 35% |
| 93 | 2 | $5.95 \times 10^3$ | $5.87 \times 10^3$ | 99% | $2.43 \times 10^3$ | 42% |
| 94 | 3 | No Casting Made | — | — | — | — |
| 95 | 4 | No Casting Made | — | — | — | — |
| 96 | 5 | No Casting Made | — | — | — | — |
| 97 | 6 | $6.39 \times 10^3$ | $0.44 \times 10^3$ | 7% | 0 | 0 |
| 98 | 7 | $6.94 \times 10^3$ | $1.43 \times 10^3$ | 21% | $2.25 \times 10^3$ | 32% |
| 99 | 8 | $5.00 \times 10^3$ | $3.78 \times 10^3$ | 76% | $1.35 \times 10^3$ | 27% |
| 100 | 9 | $8.47 \times 10^3$ | $5.72 \times 10^3$ | 67% | $2.42 \times 10^3$ | 29% |
| 101 | 10 | $8.76 \times 10^3$ | $6.14 \times 10^3$ | 70% | $2.52 \times 10^3$ | 29% |
| 102 | 11 | $6.63 \times 10^3$ | $0.93 \times 10^3$ | 14% | $1.11 \times 10^3$ | 17% |
| 103 | 12 (Control) | $12.48 \times 10^3$ | $4.73 \times 10^3$ | 38% | $1.89 \times 10^3$ | 13% |

EXAMPLES 104–115

In these examples, the physical properties and corrosion resistance of thermoset polyester containing Epolene E-43 and selected levels of high molecular weight polypropylene are determined. The resins are prepared by addition of 20% Epolene E-43 and 2.5-20% Tenite 424S polypropylene to the second-stage melt polycondensation of TMPD-based unsaturated polyesters. The polyester/polypropylene reaction products are homogeneous in the melt and remain homogeneous after dilution with 30% styrene. The thermoset flexural bars are placed in boiling 10% NaOH for 3, 6 and 12 days (initial physical properties are shown in Examples 104–109). The thermoset composition containing 20% Epolene E-43 and 5% Tenite 424S gives the best retention of flexural strength after 12 days exposure in boiling caustic (Examples 110–115). In Examples 104–115, the polyesters are derived from 75/25 TMPD/EG, 1/1 IPA/MA, except Examples 109 and 115 are bisphenol-A-fumarate.

| Ex. | Polyolefin Additive | Melt Dispersibility of Additive | Appearance of Thermoset Casting | Flexural Properties | | Tensile Properties | | Impact Strength Unnotched Izod Strength (Ft-Lb/In.) |
|---|---|---|---|---|---|---|---|---|
| | | | | Flexural Strength (PSI) | Flexural Modulus (PSI) | Tensile Strength (PSI) | Elongation to Break (%) | |
| 104 | Control | — | Clear | $10.59 \times 10^3$ | $4.82 \times 10^5$ | 3553 | 5 | 2.18 |
| 105 | 2.5% Tenite 424 20% Epolene E-43 | Homogeneous | Translucent | $7.53 \times 10^3$ | $4.52 \times 10^5$ | 3538 | 6 | 1.26 |
| 106 | 5% Tenite 424 20% Epolene E-43 | " | " | $8.42 \times 10^3$ | $4.39 \times 10^5$ | 3815 | 7 | 1.25 |
| 107 | 10% Tenite 424 20% Epolene E-43 | " | " | $7.13 \times 10^3$ | $4.34 \times 10^5$ | 3306 | 6 | 0.89 |
| 108 | 20% Tenite 424 20% Epolene E-43 | " | " | $8.13 \times 10^3$ | $4.14 \times 10^5$ | 3592 | 6 | 1.18 |
| 109 | - Commercial Control | — | Clear | $11.47 \times 10^3$ | $4.42 \times 10^5$ | 4009 | 7 | 1.19 |

| | | Exposure to Boiling 10% NaOH Flexural Strength and % Rentention of Flexural Strength | | | | | | | |
|---|---|---|---|---|---|---|---|---|---|
| | | Initial Flexural Strength (PSI) | After 3 Days | | After 6 Days | | After 12 Days | | |
| Ex. | Polyolefin Additive | | Flexural Strength (PSI) | % Retention Flexural Strength | Flexural Strength (PSI) | % Retention Flexural Strength | Flexural Strength (PSI) | % Retention Flexural Strength | Appearance After 12 Days |
| 110 | - Control | $10.59 \times 10^3$ | $3.75 \times 10^3$ | 35% | $4.03 \times 10^3$ | 38% | $2.79 \times 10^3$ | 26% | Pitted, hazy surface |
| 111 | 2.5% Tenite 424 20% Epolene E-43 | $7.53 \times 10^3$ | $7.66 \times 10^3$ | 102% | $6.43 \times 10^3$ | 85% | $6.20 \times 10^3$ | 82% | Smooth, glossy surface |
| 112 | 5% Tenite 424 20% Epolene E-43 | $8.42 \times 10^3$ | $7.05 \times 10^3$ | 84% | $6.82 \times 10^3$ | 81% | $7.24 \times 10^3$ | 86% | Smooth, glossy surface |
| 113 | 10% Tenite 424 20% Epolene E-43 | $7.13 \times 10^3$ | — | — | — | — | $1.59 \times 10^3$ | 22% | Blistered surface |
| 114 | 20% Tenite 424 20% Epolene E-43 | $8.13 \times 10^3$ | $7.12 \times 10^3$ | 88% | $6.22 \times 10^3$ | 77% | $4.63 \times 10^3$ | 57% | Blistered surface |
| 115 | - Commercial Control | $11.47 \times 10^3$ | $9.99 \times 10^3$ | 87% | $8.94 \times 10^3$ | 78% | $9.51 \times 10^3$ | 83% | Smooth, glossy surface |

EXAMPLE 116–121

These examples illustrate the effect of selected glycol structures on the corrosion resistance of polyester/polyolefin compositions. The data show that polyester compositions prepared by the melt-phase reaction with 20% maleated polypropylene (Epolene E-43) show overall enhancement of retention of flexural strength and modulus after exposure to boiling 10% NaOH, compared with the polyester controls. The most significant improvement in corrosion resistance is obtained when the glycol is TMPD.

The melt-phase prepared polyester/polyolefin compositions in these examples are prepared by methods outlined in the previous ecamples (75/25 TMPD/EG, 1/1 IPA/MA). The physical blends of unsaturated polyester and polyolefins are prepared by the addition of finely powdered polyolefins (3–50 micron particle size range) to the solution of unsaturated polyester dissolved in styrene. The polyolefin powders are dispersed in the unsaturated polyester/styrene solution by placing the materials in a glass jar and rolling the contents for 24 hrs. In each case, thermoset castings are prepared and flexural bar specimens exposed to boiling 10% NaOH. After appropriate exposure times, the specimens are removed from the corrosive medium and tested for retention of flexural strength and modulus. The results clearly show the superior corrosion resistance properties of polyester/polyolefin compositions prepared by the melt phase process compared with the conventional art of physical blends.

| | | | | Exposure to Boiling 10% NaOH | | | | | | | |
|---|---|---|---|---|---|---|---|---|---|---|---|
| | | | | Flexural Strength and % Retention | | | | Flexural Modulus and % Retention | | | |
| | | Initial | Initial | After 12 Days | | After 30 Days | | After 12 Days | | After 30 Days | |
| Ex. | Polyester Composition | Polyolefin Additive | Flexural Strength ($33^3$ PSI) | Flexural Strength ($\times 10^5$ PSI) | Flexural Strength ($\times 10^3$ PSI) | % Ret. Flex. Str. | Flexural Strength ($\times 10^3$ PSI) | % Ret. Flex. Str. | Flexural Modulus ($\times 10^3$ PSI) | % Ret. Flex. Str. | Flexural Modulus ($\times 10^5$ PSI) | % Ret. Flex. Mod. |
| 116 | TMPD/ISO/MA | Control | 12.09 | 4.51 | 7.36 | 61% | 4.76 | 39% | 4.36 | 97% | 4.36 | 97% |
| 117 | TMPD/ISO/MA | 20% Epolene E-43 | 7.88 | 4.38 | 6.84 | 87% | 4.56 | 58% | 4.22 | 96% | 3.53 | 81% |
| 118 | NPG/ISO/MA | Control | 15.65 | 5.47 | 0.60 | 4% | $0^{(1)}$ | — | 0.47 | 9% | $0^{(1)}$ | — |
| 119 | NPG/ISO/MA | 20% Epolene E-43 | 8.44 | 5.20 | 2.87 | 34% | 0.89 | 11% | 3.11 | 60% | 0.70 | 13% |
| 120 | PG/ISO/MA | Control | 15.19 | 5.53 | 0.53 | 4% | $0^{(1)}$ | — | 0.32 | 6% | $0^{(1)}$ | — |
| 121 | PG/ISO/MA | 20% Epolene E-43 | 8.67 | 5.29 | 0.50 | 6% | $0^{(1)}$ | — | 0.39 | 7% | $0^{(1)}$ | — |

(1)Samples too brittle to test

EXAMPLES 122–130

These examples demonstrate the significant differences in corrosion-resistant properties of thermoset compositions prepared by the melt phase reaction of polyolefins with an unsaturated polyester, compared with physical blend compositions of the corresponding powdered polyolefin(s) and the styreneunsaturated polyester solution.

| | Polyolefin and Method of Addition to Polyester | | Init. Flex. Str. (×10³ PSI) | Init. Flex. Mod. (×10⁵ PSI) | Exposure to Boiling 10% NaOH | | | | | | | |
|---|---|---|---|---|---|---|---|---|---|---|---|---|
| | | | | | Flexural Strength and % Retention | | | | Flexural Modulus and % Retention | | | |
| | | | | | After 12 Days | | After 30 Days | | After 12 Days | | After 30 Days | |
| Ex. | Melt Phase Reaction | Physical Blend | | | Flex. Str. (×10³ PSI) | % Ret. Flex. Str. | Flex. Str. (×10³ PSI) | % Ret. Flex. Str. | Flex. Mod. (×10⁵ PSI) | % Ret. Flex. Mod. | Flex. Mod. (×10⁵ PSI) | % Ret. Flex. Mod. |
| 122 | — | — | 12.84 | 4.63 | 2.30 | 18% | 0⁽¹⁾ | — | 2.50 | 54% | 0⁽¹⁾ | — |
| 123 | 20% Epolene E-43 | | 7.00 | 4.48 | 5.60 | 80% | 1.80 | 26% | 4.00 | 83% | 2.54 | 57% |
| 124 | | 20% Epolene E-43 | 5.29 | 4.85 | 0.54 | 10% | 0⁽¹⁾ | — | 0.57 | 12% | 0⁽¹⁾ | — |
| 125 | 20% Epolene E-43 5% Tenite 424S | | 8.76 | 4.33 | 6.14 | 70% | 2.52 | 29% | 4.49 | 104% | 3.36 | 75% |
| 126 | | 20% Epolene E-43 5% Tenite 424 | 6.51 | 4.86 | 0⁽¹⁾ | — | 0⁽¹⁾ | — | 0⁽¹⁾ | — | 0⁽¹⁾ | — |
| 127 | 20% Epolene C-16 | | 7.49 | 3.37 | 4.70 | 63% | 1.72 | 23% | 3.12 | 93% | 2.14 | 64% |
| 128 | | 20% Epolene C-16 | 8.31 | 5.13 | 3.35 | 40% | 1.33 | 16% | 4.18 | 82% | 1.49 | 29% |
| 129 | 20% Epolene C-16 5% Tenite 18BOA | | 7.17 | 3.25 | 5.23 | 73% | 0⁽¹⁾ | — | 2.72 | 84% | 0⁽¹⁾ | — |
| 130 | | 20% Epolene C-16 5% Tenite | 3.01 | 3.09 | 1.71 | 57% | 0⁽¹⁾ | — | 2.03 | 66% | 0⁽¹⁾ | — |

⁽¹⁾Samples too brittle to test.

EXAMPLES 131–138

These examples illustrate the effect of a range of dibasic acid structures selected for preparation of unsaturated polyester/polyolefin compositions, and the resulting effect of the acid structure on the corrosion resistance of the thermoset materials. The dibasic acids selected include isophthalic acid 1,4-cyclohexane dicarboxylic acid (CHDA), adipic acid and suberic acid. The polyester/polyolefin compositions are prepared with the indicated acids by the melt phase method previously described. The polyester/polyolefin resins are dissolved in 40% styrene and crosslinked with 1% benzoyl peroxide as ⅛ in. thick sheets. Flexural bar specimens (⅛ in. × ½ in. × 4 in.) are cut from the sheets and placed in 10% boiling NaOH. The bars are removed after 12 and 30 days exposure and evaluated for retention of flexural strength and flexural modulus. The results show that the structure of the dibasic acid used in the preparation of the unsaturated polyester/polyolefin composition have a significant effect on its corrosion resistance. The results show that the aromatic dibasic acid imparts higher corrosion resistance to the polyester/polyolefin composition than aliphatic acids. These examples further demonstrate the enhanced corrosion resistance of compositions containing 20% maleated polypropylene (Epolene E-43) compared with the control samples without Epolene E-43.

| | | | Init. Flex. Str. (×10³ PSI) | Init. Flex. Mod. (×10⁵ PSI) | Exposure to Boiling 10% NaOH | | | | | | | |
|---|---|---|---|---|---|---|---|---|---|---|---|---|
| | | | | | Flexural Strength and % Retention | | | | Flexural Modulus and % Retention | | | |
| | | | | | After 12 Days | | After 30 Days | | After 12 Days | | After 30 Days | |
| Ex. | Polyester Composition | Polyolefin Additive | | | Flex. Str. (×10³ PSI) | % Ret. Flex. Str. | Flex. Str. (×10³ PSI) | % Ret. Flex. Str. | Flex. Mod. (×10⁵ PSI) | % Ret. Flex. Mod. | Flex. Mod. (×10⁵ PSI) | % Ret. Flex. Mod. |
| 131 | TMPD/EG/ISO/MA | Control | 12.84 | 4.63 | 2.30 | 18% | 0⁽¹⁾ | — | 2.50 | 54% | 0⁽¹⁾ | — |
| 132 | TMPD/EG/ISO/MA | 20% Epolene E-43 | 7.00 | 4.48 | 5.60 | 80% | 1.80 | 26% | 4.00 | 83% | 2.54 | 57% |
| 133 | TMPD/EG/CHDA/MA | Control | 10.84 | 4.14 | 1.77 | 16% | 0⁽¹⁾ | — | 1.87 | 45% | 0⁽¹⁾ | — |
| 134 | TMPD/EG/CHDA/MA | 20% Epolene E-43 | 7.26 | 3.95 | 2.85 | 39% | 0.60 | 8% | 3.23 | 82% | 0.36 | 9% |
| 135 | TMPD/EG/Adipic/MA | Control | 10.19 | 2.77 | 0.74 | 7% | 0⁽¹⁾ | — | 0.42 | 15% | 0⁽¹⁾ | — |
| 136 | TMPD/EG/Adipic/MA | 20% Epolene E-43 | 8.10 | 3.03 | 1.24 | 15% | 0⁽¹⁾ | — | 1.09 | 36% | 0⁽¹⁾ | — |
| 137 | TMPD/EG/Suberic/MA | Control | 7.35 | 1.93 | 0.57 | 8% | 0⁽¹⁾ | — | 0.50 | 26% | 0⁽¹⁾ | — |
| 138 | TMPD/EG/Suberic/MA | 20% Epolene E-43 | 7.52 | 2.81 | 2.52 | 34% | 0.69 | 9% | 1.63 | 58% | 0.24 | 95 |

⁽¹⁾Samples too brittle to test.

EXAMPLES 139–148

Into a three-neck flask fitted with a stirrer, thermometer, N₂ inlet tube and heating mantle are added 1228.1 g (8.40 moles) of 2,2,4-trimethyl-1,3-pentane-diol, 396.6 g (2.75 moles) of cis,trans-1,4-cyclohexanedimethanol, 961.3 g (4.95 moles) of dimethylterephthalate, 3.1 g of dibutyltin oxide and 3.1 g of sodium tetraborate. The reaction is heated for one hour at 175° C., one hour at 185° C. and then at 195° C. and cooled to 150° C. to enable the addition of 490.5 g (5 moles) of maleic anhydride and 0.31 g of toluhydroquinone. The reaction is again heated one hour at 175° C., one hour at 185° C. and then at 195° C. until the acid number is about 50. then 268.7 g each of maleated polypropylene and low mol. wt., high density polyethylene are added and the reaction continued at 195° C. until the acid number is 30. Then 17.6 g (0.05 mole) of n-octadecyl succinic anhydride is added and the reaction continued at 195° C. After one hour the reaction is cooled slightly and decanted from the flask. The reaction is repeated with the alkyl and alkenyl succinic anhydrides and other compounds shown in Examples 139-148. Each composition is dissolved in 45% styrene monomer and left undisturbed for observation of phase separation of the polyester and polyolefin components. Shelf life means the time noted for observable phase separation of the polyester and polyolefin.

Shelf Life of Stryene Solution of Polyester/Polyolefin Composition Prepared with Alkyl and Alkenyl Succinic Anhydrides and Aliphatic Acids[1]

| Ex. | Alkyl and Alkenyl Succinic Anhydride | Carbon Chain Length (R) | Observed Shelf Life |
|---|---|---|---|
| 139 | Control (no Alkyl or Alkenyl Succinic Anhydride) | — | 4 days |
| 140 | n-Octyl Succinic Anhydride | 8 (Linear Alkyl) | 8 days |
| 141 | n-Octenyl Succinic Anhydride | 8 (Linear Alkenyl) | 30 days |
| 142 | n-Decyl Succinic Anhydride | 10 (Linear Alkyl) | 17 days |
| 143 | Dodecenyl Succinic Anhydride | 12 (Branched Alkenyl) | 14 days |
| 144 | n-Dodecenyl Succinic Anhydride | 12 (Linear Alkenyl) | >60 days[2] |
| 145 | n-Hexadecyl Succinic Anhydride | 16 (Linear Alkyl) | >60 days[2] |
| 146 | n-Octadecyl Succinic Anhydride | 18 (Linear Alkyl) | >60 days[2] |
| 147 | n-Octadecenyl Succinic Anhydride | 18 (Linear Alkenyl) | 8 days |
| 148 | n-Docosenyl Succinic Anhydride | 22 (Linear Alkenyl) | 18 days |

[1] Each Polyester/Polyolefin Composition is dissolved in 45% styrene monomer and left undisturbed for observation of phase separation of components.
[2] After 60 days observation the styrene solution of the indicated samples are homogeneous with no observable phase separation.

Unless otherwise specified, all parts, ratios, percentages, etc. are on a weight basis.

It will be understood to those skilled in the art that where the term acid is used, the corresponding anhydride may often be used and may sometimes be preferable.

The invention has been described in detail with particular reference to preferred embodiments thereof, but it will be understood that variations and modifications can be effected within the spirit and scope of the invention.

I claim:

1. Polymer composition comprising the reaction product of
   (a) from about 50 to about 90% by weight of an ethylenically unsaturated polyester derived from an α,β-ethylenically unsaturated dicarboxylic acid with a saturated aliphatic polyol,
   (b) from about 50 to about 10% by weight of a modified polyolefin derived from an α,β-ethylenically unsaturated dicarboxylic acid anhydride and a polyolefin, and
   (c) from about 0.1 to about 10 percent by weight of succinic anhydride of the formula

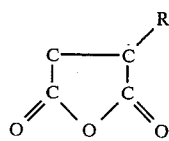

wherein R is an alkyl or alkenyl group having from 4 to 22 carbon atoms.

2. Polymer composition comprising the reaction product of
   (a) from about 55 to about 85% by weight of an ethylenically unsaturated polyester derived from an α,β-ethylenically unsaturated dicarboxylic acid with a saturated aliphatic polyol,
   (b) from about 45 to about 15% by weight of a modified polyolefin derived from an α,β-ethylenically unsaturated dicarboxylic acid anhydride and a polyolefin, and
   (c) from about 0.2 to about 2.0 percent by weight of succinic anhydride of the formula

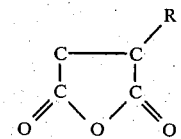

wherein R is an alkyl or alkenyl group having from 8 to 18 carbon atoms.

3. Polymer composition according to claim 2 wherein the alkyl or alkenyl group is linear.

4. Polymer composition according to claim 2 wherein R is an alkyl group having from 8 to 18 carbon atoms.

5. Polymer composition according to claim 2 wherein R is an alkenyl group having from 8 to 18 carbon atoms.

6. Polymer composition according to claim 1 wherein said polyester is derived at least in part from 2,2,4-trimethyl-1,3-pentanediol.

7. Polymer composition comprising
   I. from about 75 to about 99% by weight of the reaction product of
      (a) from about 50 to about 90% by weight of an ethylenically unsaturated polyester derived from an α,β-ethylenically unsaturated dicarboxylic acid with a saturated aliphatic polyol, and
      (b) from about 50 to about 10% by weight of a modified polyolefin derived from an α,β-ethylenically unsaturated dicarboxylic acid anhydride and a polyolefin, and
      (c) from about 0.1 to about 10 percent by weight of succinic anhydride of the formula

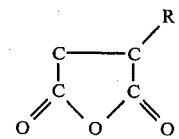

wherein R is an alkyl or alkenyl group having from 4 to 22 carbon atoms

II. from about 25 to about 1% by weight of a polymer or copolymer of an olefin dispersed in said reaction product, said polymer or copolymer having a molecular weight of from about 500 to about 50,000.

8. Polymer composition according to claim 7 wherein said succinic anhydride is present in an amount of from about 0.2 to about 2.0 percent by weight, based on the weight of the reaction product.

* * * * *